Patented July 13, 1937

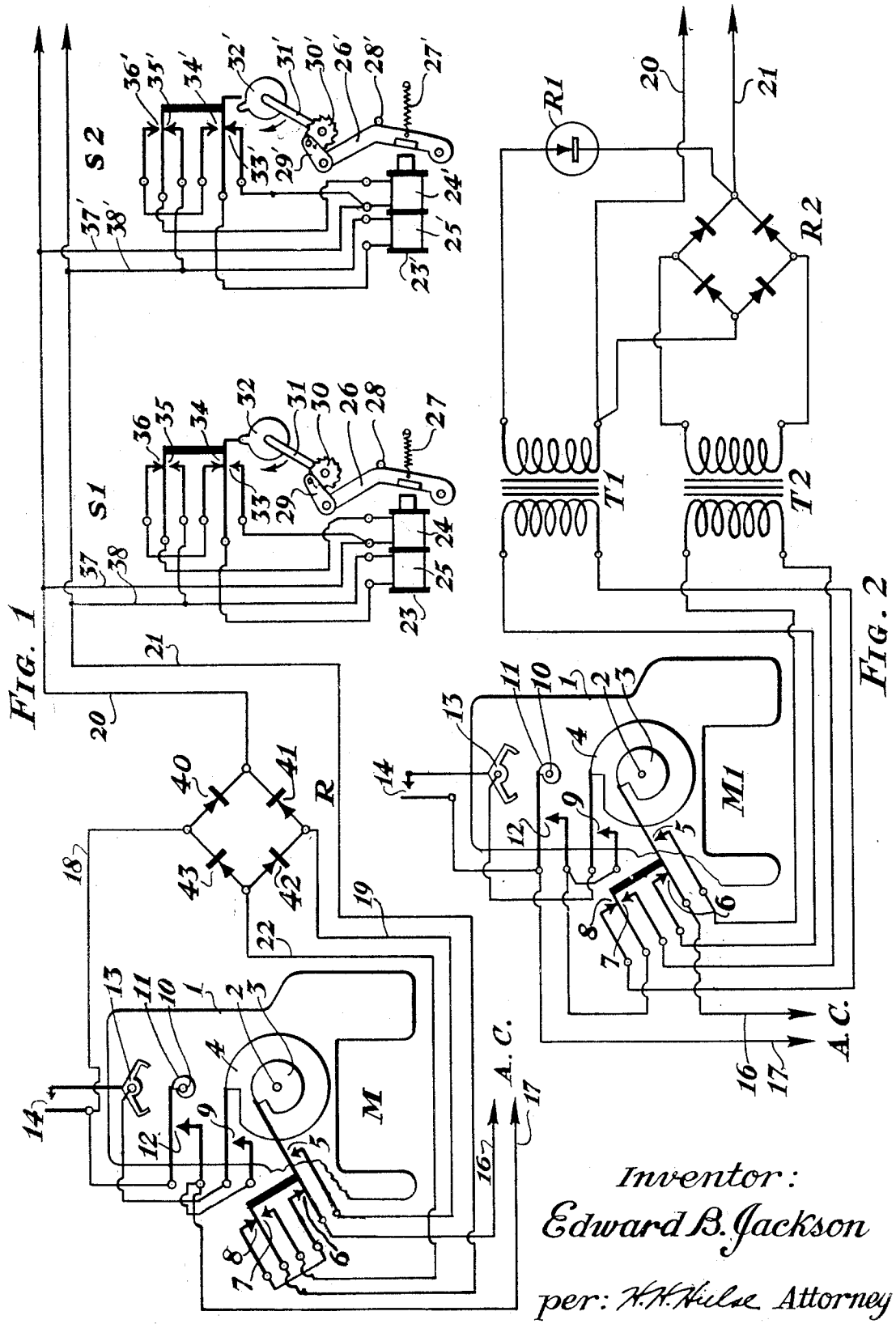

2,086,715

UNITED STATES PATENT OFFICE 2,086,715

TIME CONTROLLED SYSTEM

Edward B. Jackson, Downers Grove, Ill., assignor to Stromberg Electric Company, Chicago, Ill., a corporation of Delaware Application February 18, 1935, Serial No. 7,064

20 Claims. (Cl. 58—24)

The present invention relates in general to time-controlled systems and more particularly to systems in which a plurality of secondary apparatuses are operated and controlled by a primary or master apparatus and in which each secondary apparatus is periodically corrected or synchronized with the master apparatus.

The main object of the invention is to provide a corrective system for use where alternating current is used as the source of power supply.

It is well known that the effective output voltage of a full wave bridge rectifier is several times greater than is obtained by using one section of the full wave rectifier as a half-wave unit on the same supply source. Thus if a full-wave bridge rectifier is used with a supply source of 110 volts A. C., the no load output voltage on the secondary circuit may be in the neighborhood of 90 volts. By connecting one section of the rectifier in the circuit as a half-wave rectifier, the no load voltage on the secondary circuit would probably be in the neighborhood of 20 volts. Thus it is seen that two widely separated values of voltage may be obtained by changing from a full-wave to a half-wave rectifier connection and vice versa. According to one feature of the present invention, the master apparatus effects these changes in connections to control the correction or synchronization of the secondary apparatuses.

According to another feature of the invention, each secondary apparatus is provided with a double wound operating magnet with means for connecting the two windings in series or in multiple as determined by the chronological condition of the individual secondary apparatus.

It is also well established that a magnet can be so wound that it will operate on full-wave rectified current but will not operate on half-wave rectified current at the same effective voltage. This is no doubt due to the fact that the magnetic field built up by one pulsation of half-wave rectified current has a chance to die down before it is reinforced by the succeeding pulsation. With full-wave rectified current the pulsations follow one another so quickly that the magnetic field does not noticeably die down between pulsations. An object of one embodiment of the invention is to utilize this characteristic by keeping the voltage on the secondary circuit approximately at a constant value while the master apparatus changes the connections from the full wave to the half-wave rectifier and vice versa. The double wound secondary magnet will operate on full-wave rectified current with the two windings in series but will not operate on half-wave rectified current. With the two windings in multiple, the magnet will operate on either half-wave or full-wave rectified current.

The above and other objects and features of the invention will best be understood from a perusal of the following specification when read in connection with the accompanying drawing comprising Figures 1 and 2, which show by means of the usual schematic diagrams, two embodiments of the present invention.

Fig. 1 is a schematic circuit diagram of a corrective time system embodying the present invention, and Fig. 2 shows a modification of the master apparatus circuit as disclosed in Fig. 1, this modification being adapted to maintain the voltage on the secondary circuit practically the same irrespective of whether the half-wave or the full-wave rectifier is connected in the circuit.

Referring to the drawing in general, Fig. 1 discloses a two-wire corrective circuit in which M diagrammatically indicates the master clock having a frame indicated at 1, the usual minute contacts 12, closed momentarily once each minute, the fast contacts 14 which may be closed momentarily every two seconds, and the cut-in contacts 9 which connect the fast contacts in the circuit for the accelerating operation of slow secondary apparatus. These contacts may preferably be closed from 59 minutes 10 seconds after the hour to 59 minutes 40 seconds after the hour. In addition, the master clock is equipped with contacts 5 to 8, inclusive, which control the connections of rectifier R in the circuit as will fully appear in the detailed description of the operation of the system. Cams 3 and 4 are hour cams mounted on the minute hand shaft 2 of the master clock while cam 11 is a minute cam mounted on the second shaft 10 of the clock. The fast contacts 14 are controlled by the verge 13 of the clock in well-known manner.

S1 and S2 diagrammatically represent the secondary apparatuses, each comprising a two-winding operating magnet 23, 23', adapted to drive the secondary time mechanism by means of the usual ratchet and pawl construction including magnet armatures 26, 26', armature stops 28, 28', operating springs 27, 27', pawls 29, 29', and ratchet wheels 30, 30'. Cams 32 and 32' are cams rotated once per hour by the secondary mechanisms. These cams control the contacts 33 to 36, and 33' to 36', respectively, which in turn control the series and multiple connections of the two windings of each operating magnet 23, 23'.

Fig. 2 of the drawing discloses a modification of the master apparatus circuit in which the effective voltage on the secondary circuit is maintained practically the same irrespective of which rectifier, half-wave or full-wave, is connected in the circuit. Transformers T1 and T2 are provided to change the voltage of the power source so that the output voltages of the half-wave rectifier R1 and the full-wave rectifier R2 will be the same. The switch comprising contacts 5' to 8', inclusive, controls the connections of the A. C. source to the primary windings of transformers T1 and T2.

Having briefly described the apparatus shown on the drawing, a detailed explanation of the operation of the systems will now be given.

Referring first to Fig. 1, contacts 12 are closed momentarily once each minute by the cam 11, thereby transmitting an operating impulse to the secondary apparatuses over the following circuit: from line 17 of the A. C. supply source, contacts 12, conductor 18, section 40 of the rectifier R, conductor 20, conductor 37' of secondary apparatus S2 (secondary apparatus S2 is shown in normal operating condition whereas S1 is shown as fast and having been stopped as will appear later), windings of magnet 23' in multiple over a circuit through winding 24', contacts 35' to conductor 38' and a circuit over contacts 33', winding 25' to conductor 38', conductor 21, contacts 8, contacts 6, to the other side of the supply source over conductor 16. Magnet 23' is operated by these half-wave rectified current impulses, since its two windings are in multiple, and advances the secondary clock mechanism step-by-step by means of the ratchet and pawl construction.

It will be assumed that the secondary apparatus S1 has become fast, that is, is ahead of the master clock. When S1 reaches its 59th minute position, cam 32 operates the switch contacts, thereby breaking the multiple connection of the two windings and connecting them in series over a circuit from conductor 37, winding 24, contacts 36, contacts 34, winding 25, to conductor 38. The succeeding impulse of half-wave rectified current cannot operate magnet 23 since its windings are now in series and the effective voltage output of the half-wave rectifier unit is not high enough to cause sufficient current to flow to operate the magnet. Secondary apparatus S1, therefore, remains in position 59 until the master clock reaches a corresponding position as will be explained later.

It will be assumed that the secondary apparatus S2 is slow, that is, lags behind the master clock. Shortly after the master clock has transmitted the 59th impulse by means of minute contact 12, at about 59 minutes 10 seconds after the hour in the assumed case, cam 4 allows contacts 9 to close thereby connecting the fast contacts 14 in the circuit. These contacts send out a momentary impulse about every two seconds. These fast impulses rapidly advance the slow secondaries, such as S2, until each of such slow secondaries has reached position 59 when it will be stopped by the connection of the two windings of its operating magnet in series. When this series connection is effected the magnet will no longer operate on the half-wave rectified current impulses.

Shortly before the master clock reaches position 60, at about 59 minutes 40 seconds after the hour as assumed for purpose of explanation, cam 4 again opens contacts 9 thereby removing the fast contacts 14 from the circuit. All of the secondary apparatuses have now been operated to position 59 and have been stopped in that position.

Shortly before the master clock reaches position 60, for example, at 10 seconds before the hour or at 59 minutes 50 seconds after the hour, cam 3 opens contacts 6 and 8 and closes contacts 5 and 7. When minute contacts 12 are then closed in position 60 of the master clock, the circuit for the secondary operating magnets extends from one side of the power source over conductor 17, contacts 12, conductor 18, section 40 of rectifier R, conductor 20, conductor 37 of each secondary, winding 24, contacts 36, contacts 34, winding 25, conductor 38, conductor 21, contacts 7, conductor 22, section 42 of rectifier R, conductor 19, contacts 5, and over conductor 16 to the other side of the power source. Alternate half-waves will of course pass through sections 41 and 43 of rectifier R instead of sections 40 and 42.

It is seen that the circuit now includes the fullwave bridge rectifier and the effective voltage on the secondary circuits is sufficiently high to bring about the operation of the secondary operating magnets with their two windings connected in series. The operation of the secondary magnets causes the secondary clock mechanisms to be advanced into position 60 and into synchronism with the master clock when the magnets are released at the termination of the impulse. When the secondary apparatuses are advanced into position 60, the cams 32 again open contacts 34 and 36 and close contacts 33 and 35, thereby again connecting the two windings of each secondary magnet in multiple so the magnet may again be operated by half-wave rectified current impulses. Several full-wave rectified current impulses may be sent out by the master clock before cam 3 again opens contacts 5 and 7 and closes contacts 6 and 8 to disconnect the full-wave bridge rectifier and again connect the half-wave rectifier unit 40 in the circuit. This will insure that all of the secondary apparatuses have been advanced from position 59 and are again in condition to be operated by half-wave rectified current impulses. Therefore, the switch-over from full-wave to half-wave operation by the cam 3 may preferably occur several minutes after the hour. The operation during the remainder of the succeeding hour is with half-wave rectified current impulses and with the two windings of each secondary magnet connected in multiple.

Referring now to Fig. 2 of the drawing, the master clock shown is the same in construction as the master clock of Fig. 1. In this modification, however, separate rectifiers and associated transformers have been provided, that is an individual half-wave rectifier unit R1 has been provided instead of using one section of the bridge rectifier for the half-wave rectified current operation. Transformer T1 is a step-up transformer and transformer T2 is a step-down transformer, the ratio of the windings of the transformers being so chosen that the voltages impressed on the secondary circuit through the half-wave rectifier R1 and through the full-wave bridge rectifier R2 are practically the same.

The operation of the system using the master apparatus circuit of Fig. 2 is the same as explained above for Fig. 1. In this case, however, the voltages impressed on the secondary circuit remain constant and the operation or non-operation of the secondary magnet depends upon the frequency of the pulsations only, that is, whether half-wave or full-wave rectified current is received.

The operation for the greater part of the hour is with half-wave rectified current and with the windings of the secondary magnets connected in multiple. With this condition, the effective resistance of the secondary magnet is low enough so that sufficient current flows to operate the magnet, that is, the magnetic field built up by one pulsation does not die down sufficiently between pulsations to prevent the positive operation of the magnet. When a secondary apparatus reaches position 59, the two windings of the magnet are connected in series as explained above. The total resistance with the series connection limits the current to such an extent that the relatively weak magnetic field built up by one pulsation dies down to such an extent before the next pulsation that the magnet will not operate and the secondary apparatus is accordingly stopped.

When the master apparatus reaches position 60, the regular 60th minute impulse is transmitted through the full-wave bridge rectifier, that is, this impulse is full-wave rectified current. The pulsations composing this impulse occur twice as often as those composing the half-wave rectified current impulse. The magnetic field built up by one pulsation, therefore, does not have time to die down appreciably before it is reenforced by the field produced by the succeeding pulsation. The magnets will, therefore, operate to advance all the secondary apparatuses into position 60 and into synchronism with the master clock. The windings of the secondary magnets are again connected in multiple when the secondary apparatuses are advanced into position 60 and the master apparatus switches from full-wave to half-wave operation several minutes after the hour as explained in connection with Fig. 1.

Having described the invention, what is new and is desired to have protected by Letters Patent is:

1. In a time controlled system, master apparatus, a control circuit extending from said master apparatus to secondary apparatus, and means in said master apparatus for supplying half-wave and full-wave rectified alternating current to said control circuit in accordance with a predetermined time schedule.

2. In a time controlled system, master apparatus, a control circuit extending from said master apparatus to secondary apparatus, means in said master apparatus for supplying half-wave rectified alternating current to said control circuit for predetermined periods and for supplying full-wave rectified alternating current to said control circuit for other predetermined periods, and means for controlling said last means in accordance with master apparatus time.

3. In a time controlled system, master apparatus, a control circuit extending from said master apparatus to secondary apparatus, and means including a switch operated in accordance with master apparatus time for supplying half-wave rectified alternating current to said control circuit for predetermined periods and for supplying full-wave rectified alternating current to said control circuit for other predetermined periods.

4. In a time controlled system, master apparatus, a control circuit extending from said master apparatus to secondary apparatus, an alternating current source, a plurality of rectifying units, and means in said master apparatus for controlling the connections of said rectifying units in circuit between said source and said control circuit to supply half-wave and full-wave rectified alternating current to said control circuit as determined by master apparatus time.

5. In a time controlled system, master apparatus, a control circuit extending from said master apparatus to secondary apparatus, an alternating current source, a four section rectifier, means in said master apparatus for connecting said four section rectifier in circuit between said source and said control circuit to supply full-wave rectified alternating current to said control circuit and for connecting one section only of said rectifier in circuit between said source and said control circuit to supply half-wave rectified alternating current to said control circuit, and means for controlling said last means in accordance with master apparatus time.

6. In a time controlled system, master apparatus, a control circuit extending from said master apparatus to secondary apparatus, a full wave rectifier comprising four units, an alternating current source, a switch having contacts for connecting said rectifier in circuit between said source and said control circuit as a full-wave bridge rectifier and other contacts for connecting only one unit of said rectifier in circuit between said source and said control circuit as a half-wave rectifier, and means controlled by master apparatus time for operating said switch.

7. In a time controlled system, master apparatus, a control circuit extending from said master apparatus to secondary apparatus, an alternating current source, a first transformer having its secondary winding connected to said control circuit through a half-wave rectifier, a second transformer having its secondary winding connected to said control circuit through a full-wave rectifier, the windings of said transformers being so proportioned that the effective voltages impressed on said control circuit by said two rectifiers are approximately the same, and means in said master apparatus for alternately connecting said source to the primary windings of said two transformers in accordance with a predetermined time schedule.

8. In a secondary apparatus for use in a corrective time controlled system, an incoming control circuit over which operating impulses are received, an operating magnet having two windings, a two position switch having contacts for connecting the two windings of said magnet in multiple to said control circuit in one position of said switch and contacts for connecting the two windings of said magnet in series to said control circuit in the other position of said switch, and means controlled in accordance with the chronological condition of said secondary apparatus for operating said switch.

9. In a secondary apparatus for use in a corrective time controlled system, an incoming control circuit over which operating impulses are received, an operating magnet connected in said control circuit, said magnet having two windings, and means controlled in accordance with the chronological condition of said secondary apparatus for connecting said two windings in multiple for certain predetermined periods and in series for other predetermined periods.

10. In a secondary apparatus controlled from a master apparatus, the combination of electromagnetic actuating means therefor having two windings, a switch, and means controlled in accordance with the chronological position of said apparatus for selectively operating said switch to connect said two windings in series and in multiple.

11. In a corrective time controlled system, master apparatus having means for transmitting half-wave rectified alternating current impulses and full-wave rectified alternating current impulses over a common circuit to secondary apparatus, and selective means in said secondary apparatus for determining the effectiveness of said impulses to advance said secondary apparatus.

12. In a corrective time controlled system, master apparatus having means for transmitting half-wave rectified alternating current impulses and full-wave rectified alternating current impulses over a common circuit to secondary apparatus, actuating means for said secondary apparatus including a magnet having two windings, and means for selectively connecting said two windings in multiple and in series to said common circuit to selectively render said actuating means operative and inoperative responsive to said impulses.

13. In a corrective time controlled system including master apparatus and secondary apparatus in which the secondary apparatus is operated and periodically corrected by impulses transmitted from the master apparatus, means in said master apparatus for transmitting a plurality of half-wave rectified alternating current impulses and at least one full-wave rectified alternating current impulse, and means in said secondary apparatus controlled in accordance with the chronological condition thereof for determining the effectiveness of said half-wave rectified alternating current impulses to advance said secondary apparatus.

14. In a corrective time controlled system including master apparatus and secondary apparatus in which the secondary apparatus is operated and periodically corrected by impulses transmitted from the master apparatus, a control circuit connecting said master and secondary apparatuses, means in said master apparatus for controlling the transmission of half-wave rectified alternating current impulses and of full-wave rectified alternating current impulses over said control circuit, and means in said secondary apparatus controlled jointly by the chronological condition of said secondary apparatus and the kind of impulse received for determining the effectiveness of the received impulse to advance said secondary apparatus.

15. In a corrective time controlled system, master apparatus and secondary apparatus connected by a control circuit, an operating magnet in said secondary apparatus having two windings normally connected in multiple to said control circuit, means in said master apparatus for transmitting normal operating and rapid accelerating impulses of half-wave rectified alternating current over said control circuit for operating said magnet to advance said secondary apparatus, means effective when said secondary apparatus reaches a predetermined chronological position for connecting the two windings of said magnet in series in said control circuit to render said magnet inoperative by said half-wave rectified current impulses, and means in said master apparatus effective when it reaches a corresponding chronological position for transmitting at least one impulse of full-wave rectified alternating current over said control circuit to again operate said magnet and advance said secondary apparatus.

16. In a time controlled system, master apparatus, a control circuit extending from said master apparatus to secondary apparatus and having two branches at said master apparatus, a half-wave rectifier in the first of said branches, a full-wave rectifier in the second of said branches, an alternating current source, means for alternately connecting said soure to said two branches in accordance with a predetermined time schedule, and transformer means for maintaining the voltage impressed on said control circuit the same irrespective of the branch to which said source is connected.

17. In a time controlled system, master apparatus, an outgoing control circuit extending to secondary apparatus, an alternating current source, means for alternately supplying half-wave and full-wave rectified alternating current to said control circuit in accordance with a predetermined time schedule, and transformer means for maintaining the voltage of said impulses at the same value irrespective of whether half-wave or full-wave rectified alternating current impulses are being supplied.

18. In a corrective time controlled system, master apparatus and secondary apparatus connected by a control circuit, means in said master apparatus for alternately transmitting half-wave and full-wave rectified alternating current impulses over said control circuit in accordance with a predetermined schedule, an operating magnet in said secondary apparatus having two windings so proportioned that said magnet is operated by both kinds of impulses with said windings in multiple and is not operated by half-wave rectified alternating current impulses with said windings in series, and means controlled in accordance with the chronological position of said secondary apparatus for selectively connecting said windings in series and in multiple.

19. In a secondary clock, the combination of clock mechanism, electromagnetic actuating means for advancing said mechanism having two windings, and means for selectively connecting said windings in series and in multiple for predetermined periods in accordance with secondary clock time.

20. In a time controlled system, master apparatus and secondary apparatus connected by a control circuit, means in said master apparatus for transmitting impulses of two different characteristics over said control circuit in predetermined sequence, electromagnetic actuating means for said secondary apparatus having two windings associated with said control circuit, and means for selectively connecting said two windings in multiple and in series to render said actuating means responsive and unresponsive to impulses of one characteristic for predetermined periods in accordance with secondary apparatus time.

EDWARD B. JACKSON.